No. 794,505. PATENTED JULY 11, 1905.
C. JOHNSON.
FERTILIZER DISTRIBUTER.
APPLICATION FILED OCT. 6, 1904.

5 SHEETS—SHEET 2.

WITNESSES:
C. H. Fulmer.
J. J. Laas

INVENTOR
Charles Johnson
By E. Laas
ATTORNEY.

No. 794,505. PATENTED JULY 11, 1905.
C. JOHNSON.
FERTILIZER DISTRIBUTER.
APPLICATION FILED OCT. 6, 1904.

5 SHEETS—SHEET 3.

WITNESSES:

INVENTOR
Charles Johnson
By E. Laass
ATTORNEY

No. 794,505. PATENTED JULY 11, 1905.
C. JOHNSON.
FERTILIZER DISTRIBUTER.
APPLICATION FILED OCT. 6, 1904.

5 SHEETS—SHEET 4.

WITNESSES:
C. H. Fulmer.
J. J. Laass.

INVENTOR
Charles Johnson
By E. Laass
ATTORNEY.

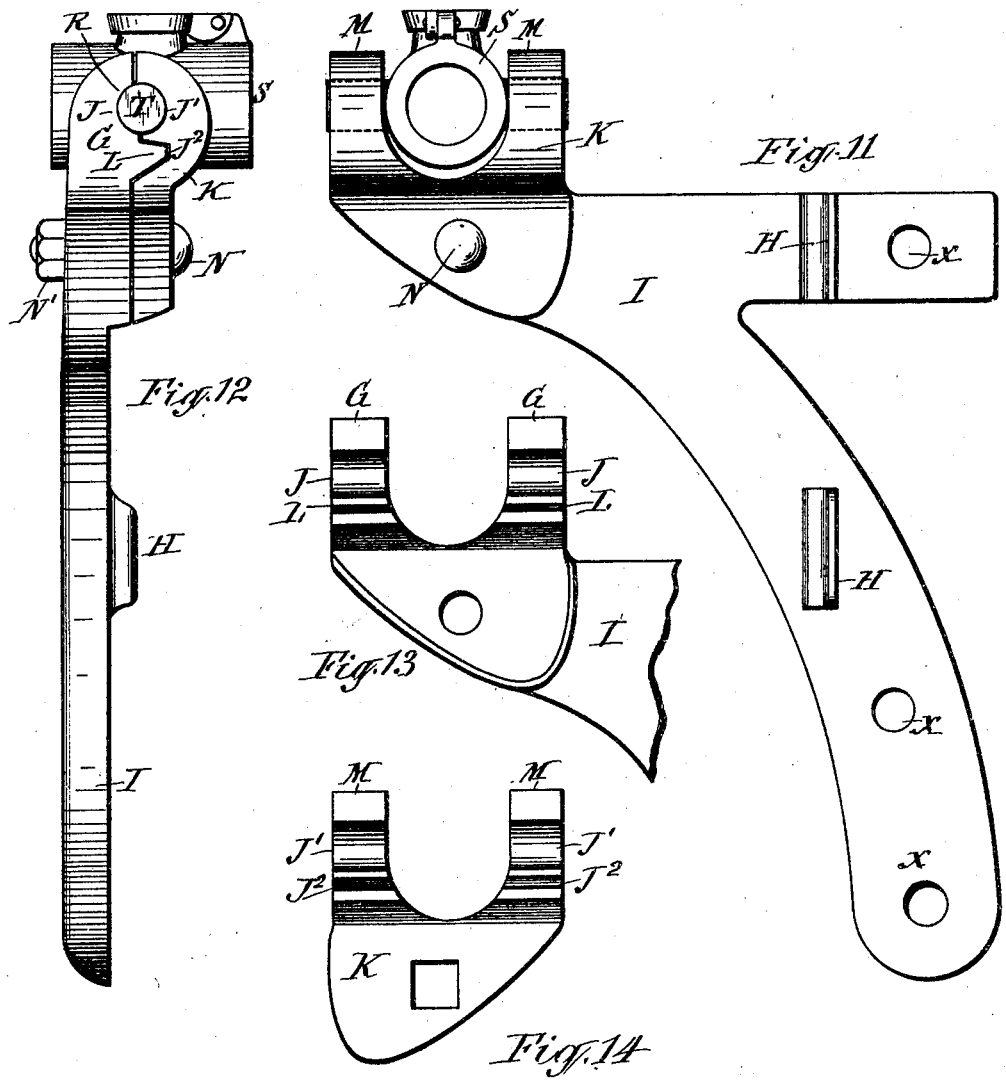

No. 794,505.  
Patented July 11, 1905.

UNITED STATES PATENT OFFICE.

CHARLES JOHNSON, OF CORTLAND, NEW YORK, ASSIGNOR, BY MESNE ASSIGNMENTS, TO GEORGE H. GARRISON AND CHARLES M. DE VANY, OF CORTLAND, NEW YORK.

FERTILIZER-DISTRIBUTER.

SPECIFICATION forming part of Letters Patent No. 794,505, dated July 11, 1905.

Application filed October 6, 1904. Serial No. 227,377.

*To all whom it may concern:*

Be it known that I, CHARLES JOHNSON, of Cortland, in the county of Cortland, in the State of New York, have invented new and useful Improvements in Fertilizer-Distributers, of which the following, taken in connection with the accompanying drawings, is a full, clear, and exact description.

This invention relates to the so-called "beater" which is applied to the rear end of the vehicle-body for the purpose of more uniformly spreading the fertilizer delivered from the rear end of the vehicle by means of a traveling apron constituting the bottom of the vehicle-body.

The objects of the invention are, first, to provide simple and efficient means for controlling the actions of the beater and the tail-gate employed in connection with said beater; secondly, to provide simple, inexpensive, and convenient means for automatically locking the aforesaid controlling devices in their required different positions; thirdly, to provide the beater-shaft with supports which shall be capable of effectually resisting the forward strain exerted on said shaft, and, fourthly, to provide the beater-shaft with axial supports which shall permit the said shaft to be readily applied and equally as readily removed from said supports when desired; and to that end the invention consists in the novel construction and combination of parts hereinafter described.

Figure 1:
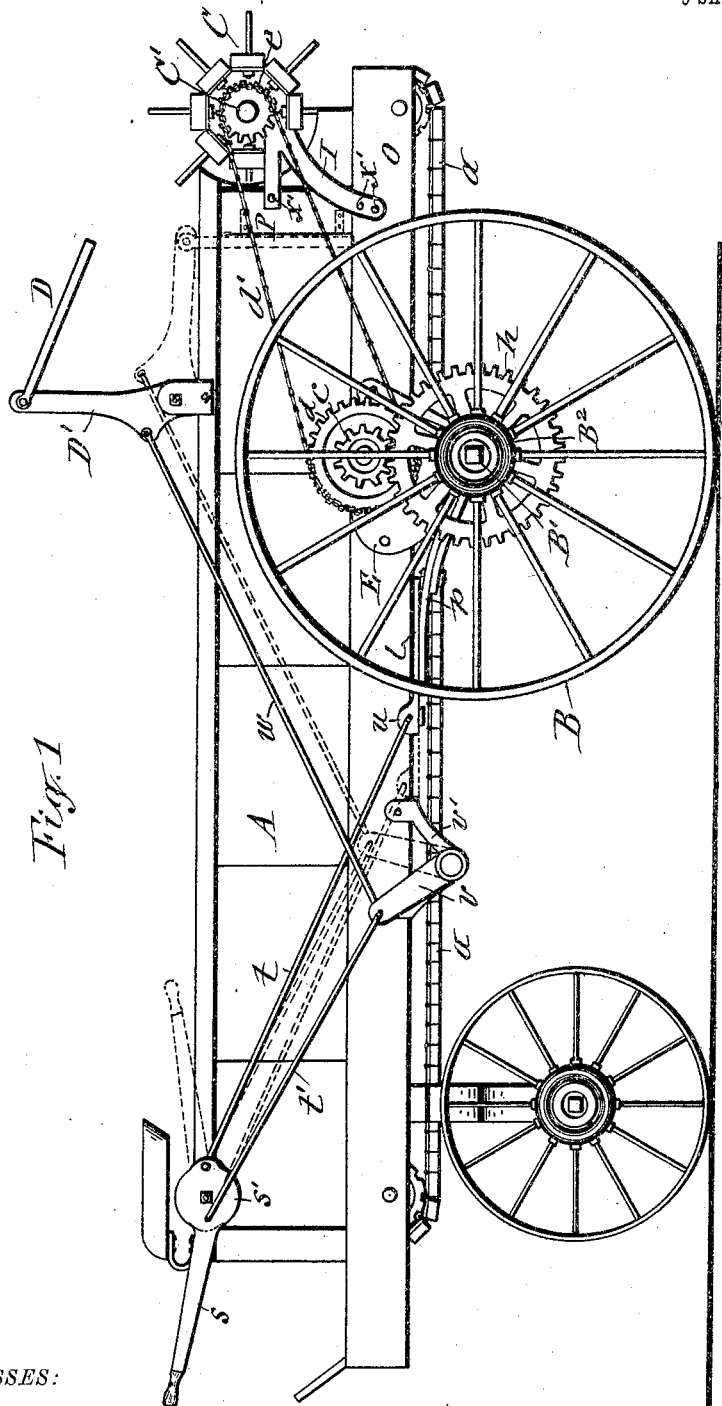
Figure 2:
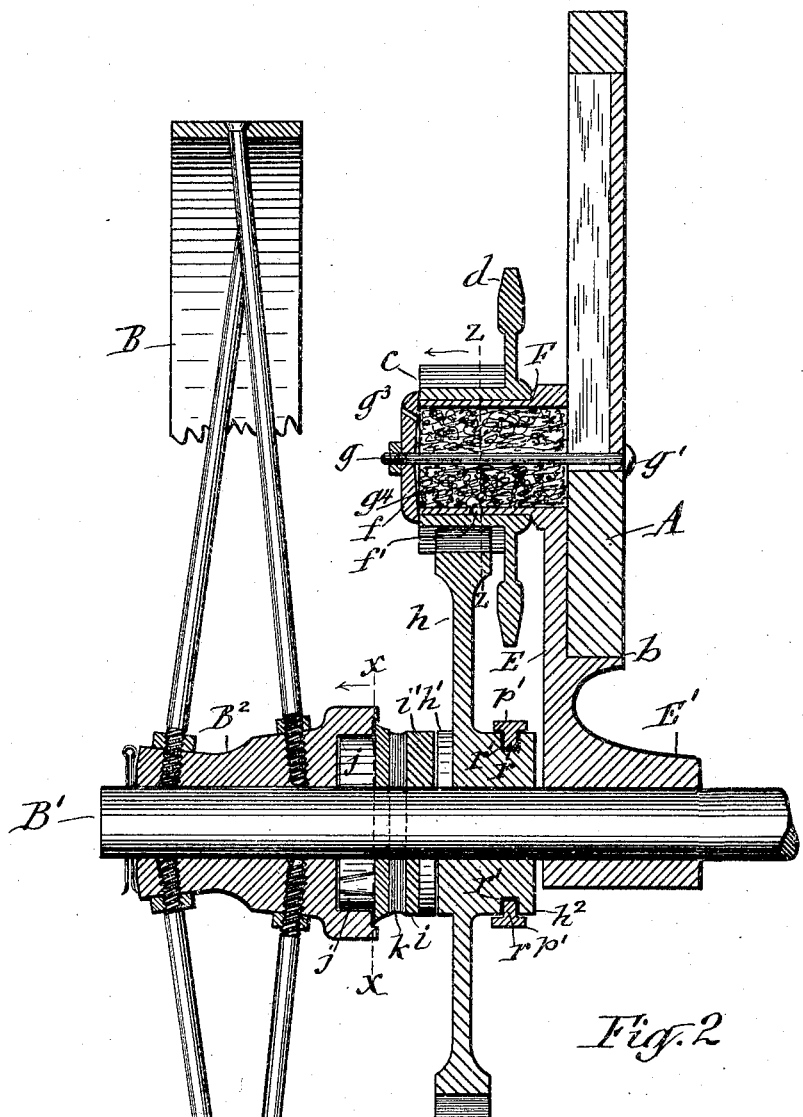
Figure 3:
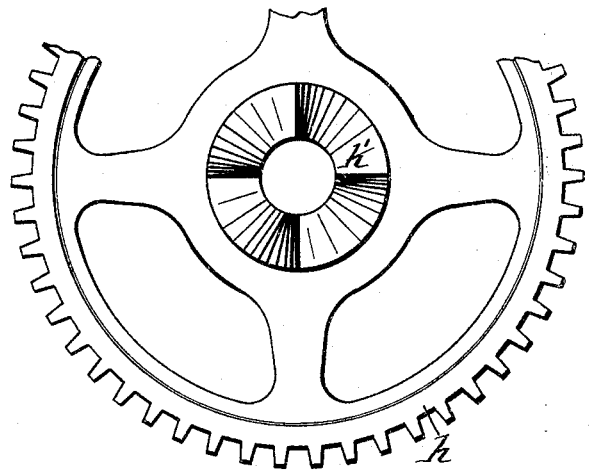
Figure 4:
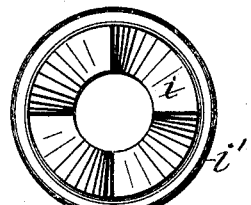
Figure 5:
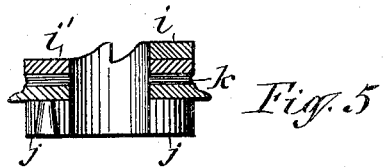
Figure 6:
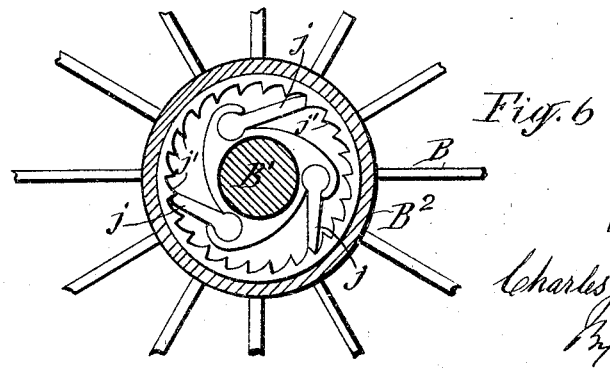
Figure 7:
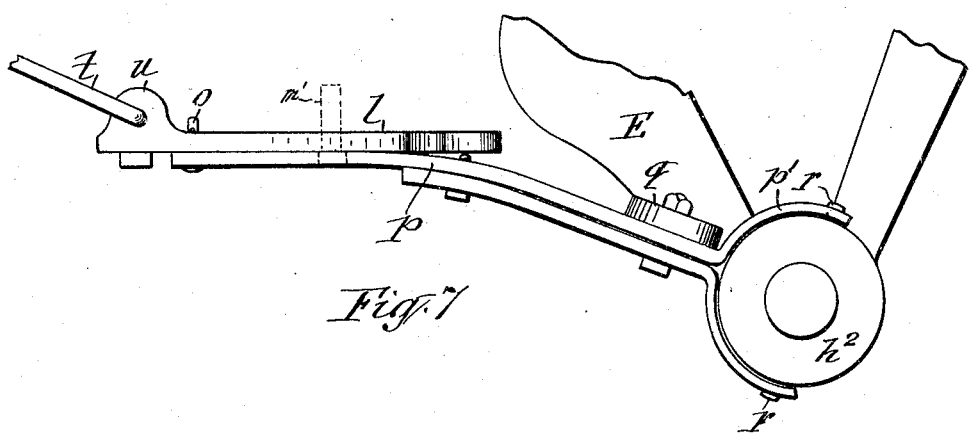
Figure 8:
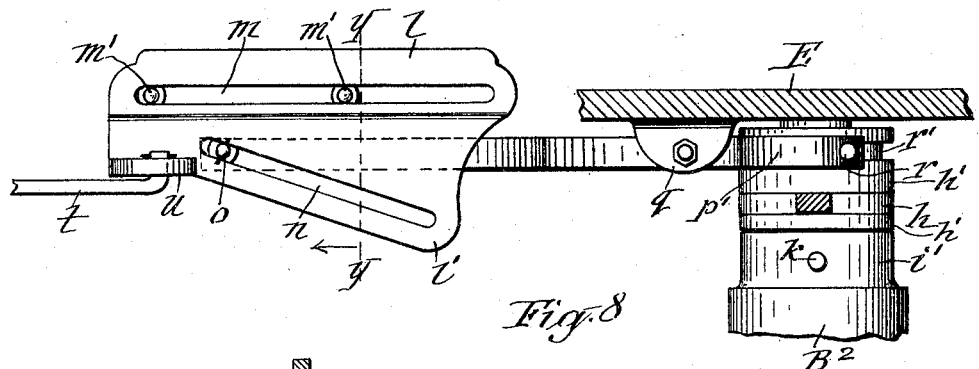
Figure 9:
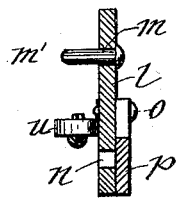
Figure 10:
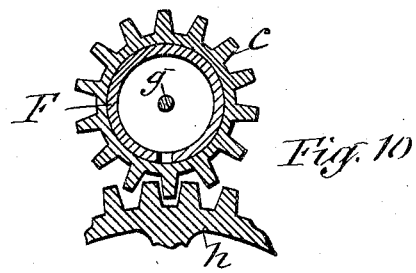

In the accompanying drawings, Figure 1 is a side view of a fertilizer-distributer embodying my improvements. Fig. 2 is a vertical transverse section through the center of the traction-wheel and gear-wheel deriving motion from said traction-wheel. Figs. 3 and 4 are face views of the clutch members which transmit motion to the aforesaid gear-wheel. Fig. 5 is a transverse section of the clutch-collar. Fig. 6 is a transverse section on the line X X in Fig. 2 viewed in the direction of the dart. Fig. 7 is an enlarged side view of the longitudinally-movable plate and clutch-shifting lever actuated by said plate. Fig. 8 is a plan view of the same. Fig. 9 is a transverse section on line Y Y in Fig. 8 viewed in the direction of the dart. Fig. 10 is a transverse section on line Z Z in Fig. 2 viewed outward from the vehicle-body. Fig. 11 is an enlarged inner side view of one of the brackets which support the beater. Fig. 12 is an edge view of the said bracket. Fig. 13 is a fragmentary inner side view of the free end of the aforesaid bracket. Fig. 14 is a face view of the cap which is attached to the bracket and forms part of the bearing for the beater-shaft, and Fig. 15 is a detached side view of one of the journal-boxes of the beater-shaft.

Similar letters of reference indicate corresponding parts.

A represents the body of the vehicle, in which is carried the fertilizer to be distributed.

B denotes one of the traction-wheels from which is derived the power for actuating the usual beater C.

*a* denotes the endless apron or floor, which travels with its upper half in the bottom of the body A and carries the fertilizer gradually to the rear end of the body, from whence the fertilizer is distributed over the ground.

D represents the tail-gate, which is pivotally supported upon the top of the body A and is raised into position across the top of the body in front of the beater when said beater is set into operation.

For operating the beater C, I employ the following mechanisms: To the side of the body A is rigidly attached a bracket E, the bottom portion of which is formed with a sleeve E', through which the axle passes. Above the said sleeve is an inwardly-projecting shoulder *b*, formed on the said bracket and supporting upon it the body A, as more clearly shown in Fig. 2 of the drawings. The top portion of the bracket E is formed with an outwardly-projecting tubular stud F, on which is journaled a pinion *c*, one end of which is formed with a sprocket-wheel *d*, which is connected by a sprocket-chain *d'* with a sprocket-wheel *e*, attached to the end of the beater-shaft C'. The pinion *c* with the sprocket-wheel *d* are retained on the stud F by means of a plate *f*, covering the outer end of said stud and lapping onto the end of the hub of said pinion. The plate $f$ is secured in its position by means of a bolt $g$, which passes longitudinally through the center of the stud F and through the plate $f$ and side of the body A and is provided on one end with a head $g'$ and on the opposite end with either a nut $g^2$ or a cotter or other suitable removable fastening device which permits removal of the pinion $c$ and sprocket-wheel $d$ and access to the interior of the stud F when required. The plate $f$ is provided with a lubricant-supply duct $g^3$, through which to introduce lubricant into the interior of the stud F, the bottom of which stud is provided with a perforation $f'$, through which the lubricant passes from the cavity of the stud to the bearings of the pinion $c$ and sprocket-wheel $d$. I prefer to place into the cavity of the stud F a sufficient amount of cotton waste, as indicated at $g^4$ in Fig. 2, to prevent excessive flow of lubricant from the cavity of the said stud. The axle B' is revolubly connected to the body A and has loosely mounted on it a gear-wheel $h$, which is provided on its outer side with an annular clutch member $h'$, facing a correspondingly-shaped clutch member $i$, formed on the inner face of a clutch-collar $i''$, which is fastened to the axle B' by a pin $k$, passing transversely through the clutch-collar and axle or by other suitable fastening means. The outer side of the clutch-collar $i''$ has pivoted to it dogs $j\ j$, which engage an annular ratchet $j''$, formed in a cavity in the inner end of the hub B² of the traction-wheel B, which is mounted loosely on the axle. The engagement of the ratchet with the dogs $j\ j$ during the forward movement of the vehicle imparts rotary motion to the clutch-collar $i''$, and by shifting the gear-wheel $h$ on the axle outward, so as to throw the clutch member $h'$ to engage the clutch member $i$, the gear-wheel $h$ is caused to receive rotary motion from the clutch-collar $i''$. The rotation of the gear-wheel $h$ imparts accelerated motion to the pinion $c$ and sprocket-wheel $d$, from whence said motion is transmitted to the beater C by means of the chain $d'$.

For throwing the gear-wheel in and out of engagement with the clutch-collar $i''$ I connect to the under side of the longitudinal sill of the vehicle-body A a longitudinally-movable plate $l$, which is provided with a longitudinal slot $m$, through which pass the shanks of the bolts or pins $m'$, which secure the plate to the body and guide said plate in its movement in a line parallel with the line of draft of the vehicle. The plate $l$ is formed with a side extension $l'$, which is provided with a longitudinal slot $n$, disposed oblique or at an angle to the line of movement of the plate $l$. In this slot $n$ is inserted a pin $o$, which projects from the front end of a lever $p$, pivoted at a point intermediate its ends to an outward projection $q$, formed on the bracket E. The rear end of the lever $p$ is formed with a fork $p'$, straddling the hub $h^2$ of the gear-wheel $h$ and provided with rigid pins or lugs $r$, which engage a circumferential groove $r'$ in the aforesaid hub.

By moving the plate $l$ rearward the forward end of the slot $n$ pushes the pin $o$ toward the side of the body A, as shown in Fig. 8 of the drawings. Said movement causes the forked rear end of the lever $p$ to move outward and push the pinion to a position which causes the clutch member $h'$ to engage the clutch member $i$ of the collar $i''$, the rotary motion of which is thus transmitted to the gear-wheel $h$. A forward movement of the plate $l$ reverses the movement of the lever $p$ and causes said lever to throw the gear-wheel $h$ out of engagement with the clutch-collar $i''$, and thus arrests the rotary motion of said gear-wheel.

For moving the plate $l$ as aforesaid I employ the hand-lever S, which is pivoted at one end to the side of the front portion of the body A, as shown in Fig. 1 of the drawings. The pivoted end of this hand-lever is formed with an annular enlargement S', which is concentric to the pivot of said lever. To this enlargement are connected two rearwardly-extending rods $t$ and $t'$. Their points of connection are arranged at opposite sides of the pivot of the lever and nearly or quite in line with the lever for the purpose hereinafter explained. The rod $t$ is connected at its rear end to an ear $u$ on the movable plate $l$ to shift said plate longitudinally forward and rearward by the throw of the hand-lever S in opposite directions on its pivot. The other rod $t'$ is connected at its rear end to the free end of an arm $v$, pivoted to a hanger $v'$, attached to the body A. Another rod $w$ is connected to the free end of the arm $v$ and is extended to the pivoted post D' of the tail-gate D.

In throwing the hand-lever S forward, as shown by full lines in Fig. 1 of the drawings, the rod $t$ is pushed rearward, and thereby sets in motion the beater C, as hereinbefore described. At the same time the other rod $t'$ is drawn forward and causes the rod $w$ to elevate the tail-gate D. By throwing the hand-lever S rearward, as indicated in dotted lines in Fig. 1, the rod $t$ is drawn forward and the rod $t'$ pushed rearward, and thus reverses the condition of the beater and tail-gate. The beater and tail-gate are automatically locked in either of the aforesaid conditions by gravity of the hand-lever, owing to the described arrangement of the connections of the rods $t\ t'$ to the hand-lever.

One of the objects of my present invention is to further improve the fertilizer-distributer by providing a firmer and more efficient pivotal support for the beater-shaft, which object I attain by the use of the supporting-brackets I, which are perforated, as shown at X X in Fig. 11 of the drawings, for reception of bolts X' X', by means of which the brackets are attached to the outer sides of the posts P and sills O of the vehicle-body. Each of these brackets is formed with laterally-projecting shoulders H H, which abut against the rear face of the post P, and thus serve to resist the forward strain exerted on the beater by the tension of the sprocket-chain $d'$. The bracket I is also formed with upwardly-projecting ears G G and with a semicircular groove J, extending horizontally across the said ears at one side of the bracket, and with horizontal ribs L below the grooves J. On the same side of the bracket is a cap K, which is detachably secured to the bracket by means of a bolt N, passing transversely through the cap and bracket and provided with a nut N'. The cap K is formed with ears M M, semicircular grooves J' J', and grooves $J^2$, corresponding to the aforesaid ears, grooves, and ribs of the bracket, and when said cap is secured to the bracket the ribs L are inserted into the grooves $J^2$, and thus sustain the cap firmly in position to form a circular opening R between it and the bracket.

S represents one of the journal-boxes of the beater-shaft. This journal-box is formed with trunnions T and applied to the bracket by removing the cap K and placing the trunnions T into the semicircular grooves J in the ears G G of the bracket, then applying the cap K to the bracket and fastening it thereto by the bolt N, as shown in Fig. 12 of the drawings.

What I claim as my invention is—

1. The combination, with the vehicle, the beater, the tail-gate and mechanism transmitting motion to said beater, of a clutch for engaging and releasing said mechanism, a plate connected to the vehicle-body movably in the line of draft and formed with an oblique guide, a lever pivoted to the vehicle-body and engaging at opposite ends the clutch and aforesaid guide, a rock-arm throwing the tail-gate in and out of operative position, a hand-lever pivoted to the forward end of the vehicle-body, and two rods connected at their rear ends to the aforesaid movable plate and rock-arm, the front ends of said rods being connected to the pivoted end of the hand-lever to operate the aforesaid plate and rock-arm simultaneously, and disposed diametrically opposite each other at the pivot of the hand-lever to lock said plate and rock-arm automatically in their positions as set forth.

2. In combination with the body, beater, tail-gate and mechanism transmitting motion to the beater, a clutch for throwing said mechanism in and out of gear, a plate connected to the body movable lengthwise thereof and formed with a side extension provided with a slot disposed oblique to the line of movement of the plate, a bracket attached to the body and formed with an outward projection, a lever pivoted to said projection and engaging at its rear end the aforesaid clutch and provided at its opposite end with a pin extending into the aforesaid oblique slot, a hanger attached to the body in front of the aforesaid movable plate, an arm pivoted to said hanger, a rod connecting the free end of said arm to the tail-gate, a hand-lever pivoted to the forward portion of the body and formed with an annular enlargement concentric to the pivot, and two rods connected to said enlargement at points diametrically opposite each other and in line with said hand-lever, the rear ends of said rods being connected one to the free end of the aforesaid pivoted arm and the other to the movable plate, said rods receiving reverse movement and being locked at the ends of their movements automatically by the gravity of the hand-lever, substantially as set forth and shown.

3. The combination, with the vehicle and beater, of brackets attached to the vehicle-body, and each of said brackets formed with vertically-projecting ears and with semicircular grooves across said ears, a cap formed with correspondingly-shaped ears and grooves and detachably secured to the side of the brackets, and a journal-box applied to the end of the beater-shaft and inserted between the aforesaid ears and provided with trunnions seated in the semicircular grooves of the bracket and cap as set forth and shown.

4. The combination, with the vehicle and beater, of brackets supporting the ends of the beater-shaft and attached to the end posts and sills of the vehicle-body and formed with laterally-projecting shoulders engaging said parts of the vehicle-body, each of said brackets formed with vertically-projecting ears and with semicircular grooves extending horizontally across said ears, a cap formed with correspondingly-shaped ears and grooves and detachably secured to the side of the bracket, and a journal-box applied to the end of the beater-shaft and inserted between the aforesaid ears and provided with trunnions seated in the semicircular grooves of the bracket and cap substantially as set forth.

5. The combination with the vehicle and beater, of brackets attached to the sides of the vehicle-body and each of said brackets formed with vertically-projecting ears, semicircular grooves horizontally across said ears and horizontal ribs below the grooves, a cap formed with correspondingly-shaped ears and grooves and with grooves receiving the aforesaid ribs, a bolt fastening the cap to the bracket, and a journal-box applied to the end of the beater-shaft and inserted between the aforesaid ears and formed with trunnions seated in the semicircular grooves of the bracket and cap substantially as described and shown.

CHARLES JOHNSON. [L. S.]

Witnesses:
R. H. WANNER,
H. A. WILLIS.